UNITED STATES PATENT OFFICE.

ROBERT R. ROBERTS, OF WASHINGTON, DISTRICT OF COLUMBIA, ASSIGNOR, BY MESNE ASSIGNMENTS, TO WILLIAM J. ROBINSON, OF NEW YORK, N. Y.

PROCESS OF TREATING FIBROUS MATERIAL.

952,996.  Specification of Letters Patent.  Patented Mar. 22, 1910.

No Drawing.  Application filed October 27, 1909. Serial No. 524,987.

*To all whom it may concern:*

Be it known that I, ROBERT R. ROBERTS, a citizen of the United States, residing at Washington, in the District of Columbia, have invented certain new and useful Improvements in Processes of Treating Fibrous Material, of which the following is a description.

My invention relates to the degumming of fibers of fiber bearing plants such as flax, ramie, jute, hemp, pita and other plants which contain fibers capable of use for the manufacture of textile fabrics, cordage or paper, and in which the fibers are held together by resinous or gummy substances.

The stalks of fiber bearing plants are composed in addition to the fibers and the gummy or resinous substances uniting them, of woody material usually surrounding the fibers, containing little or no fiber but containing more or less gummy or resinous substances. It is of course necessary to remove this woody material from the fiber and it is also necessary to remove the gummy or resinous substances from the fiber in order that the fibers may be so separated from each other so as to be capable of being spun or otherwise treated for use. In order to remove this woody material, or "shive" as it is usually termed, from flax and to also remove the gummy or resinous substances the usual, and in fact the only commercially practicable process has been that of slow rotting or "retting" of the flax under or in the presence of water. This process is expensive because of the length of time and the care and attention required and also because of the destruction by rotting, of a considerable portion of the fiber. Because of the expense of separating the fiber, the growing of flax for fiber has practically ceased for many years, in the United States and while flax is extensively grown in the United States, it is grown only for its seed and the straw is practically a waste product.

While attempts have heretofore been made to get rid of the woody material and the gummy or resinous substances by chemical action, the success of such attempts has not been such as to be commercially practical and all of the flax fiber used for textile fabrics and practically all that is used for any purpose throughout the world is produced by the retting process.

By the process of the present invention it is made possible to quickly and effectively remove the woody material of flax straw or the stalks or straw of other fiber bearing plants and to also dissolve out and remove the gummy or resinous substances so as to secure substantially all of the fiber originally contained in it without loss or injury. The process while applicable to the treatment of straw or stalks as they come from the field is preferably applied to the treatment of the material after the woody material or shive has been first removed by mechanical treatment.

In carrying out the process in the preferred way, the flax straw or other plant stalks or straw, preferably thoroughly dry, is broken mechanically in such a way as to break up the comparatively brittle woody material without affecting the tougher fiber, and the broken portions of the woody material removed. This breaking up of the straw may be readily effected by passing it through between corrugated rolls or by the use of other known flax breaking or hemp breaking devices, and the broken portions of the woody material may be readily removed by beating or shaking them up. The purpose of thus removing the woody material is to reduce the bulk of the material to be subjected to chemical treatment and to thus reduce the amount of chemicals necessary to be used as well as to lessen the expense of handling. The extent to which the woody material will be removed in this preliminary mechanical treatment will depend upon the cost of the breaking and removing of the woody material.

The material remaining after the preliminary mechanical treatment is a mass of fiber bound together by gummy or resinous substances with more or less adherent woody material. This rough fiber is then placed, preferably in bundles, in a tank or vat and is then boiled in an alkaline degumming solution for from one to two hours and at the end of this time the degumming solution is drawn off and the material is subjected to a washing or rinsing with clean water to free it from any of the degumming solution remaining in it. After thus washing or rinsing the material the wash water is drawn off and an acid solution or sour bath solution is introduced to neutralize any traces of alkali which may remain in the treated material as well as to aid in completing the dissolving of the gummy or resinous substances. After the sour bath has been allowed to remain on the material being treated for about twenty minutes, it is drawn off and the material again washed with clean water. After being thus again washed a weak alkaline solution, which may be termed a "soap solution" is introduced into the tank or vat and allowed to remain a few minutes only, preferably not more than from ten to fifteen minutes and is then drawn off. The material being treated is then again washed and its chemical treatment is then complete. All that is then necessary is to remove the mass of fiber remaining from the tank or vat and dry it. The material may be agitated to facilitate the action of the several solutions and wash waters, either by moving the material mechanically or by introducing air under pressure at the bottom of the tank.

The degumming solution dissolves the gummy or resinous substances separating the fibers from each other and also separating any adherent woody material, and the dissolved substances together with the particles of woody material pass off with the solution when it is drawn off. The subsequent treatment either with or without agitation leaves the fiber free not only from the gummy or resinous substances but also from any alkaline or acid substance which might injure it.

It is important to the success of the process that the degumming solution shall be capable of effectively dissolving the gummy or resinous substances while at the same time not dissolving or injuriously affecting the fiber itself. The solution which is found to have these qualities and the only solution which I have found to be effective for the purpose is a solution containing caustic potash (KOH) or caustic soda (NaOH), sodium borate ($Na_2Bo_4O_7$) and sal soda ($Na_2CO_3$). The precise action of these several alkalies it would be difficult if not impossible to precisely determine but without the three being used the results are unsatisfactory. It is, however, apparent that the boron salt is particularly useful in the degumming operation from the fact that boron containing compounds such as the boric acid salts of which borax is a species, when in aqueous solution have the property of rendering gummy, resinous and other ordinarily water insoluble substances of similar character soluble. The utility of the water soluble boron compound will be clear from the above stated fact when employed by itself or associated with the other degumming ingredients set forth. This water soluble boron compound as an ingredient of the degumming solution is an important feature of the invention. The solution is found to be most satisfactory for degumming flax fiber when the several alkalies are used in the following proportions viz.: caustic potash (or caustic soda) 20 parts, sodium borate 4 parts and sal soda 6 parts. The strength of the solution may be varied but it is preferably made by adding for each five gallons of water, 20 ounces caustic potash (or caustic soda) 4 ounces borate of soda, and 6 ounces of sal soda. To each five gallons of the solution is preferably added from 4 to 8 fluid ounces of kerosene oil and from 2 to 4 ounces of linseed oil. The kerosene oil appears to aid in softening and dissolving the gummy or resinous substances and the linseed oil appears to soften the fiber and render it less liable to become brittle. It is probable that the linseed oil is saponified by the alkalies setting free glycerin which probably acts directly upon the fibers.

The sour bath has as its chief ingredient sulfuric acid with which may also be used a small quantity of acetic acid and a still smaller quantity of nitric acid. Preferably the sulfuric acid is used in the proportion of one ounce to each five gallons of water and to this may be added 12 c. c. of acetic acid and 2 c. c. of nitric acid. The acetic acid or nitric acid or both may be omitted.

The "soap solution" has for its chief ingredient sal soda in the proportion of from 2 to 4 ounces to each five gallons of water and to this is preferably added one fourth of an ounce of concentrated ammonia, caustic potash (or caustic soda) in the proportion of from one to four ounces to each five gallons of water, though the sal soda either alone or with the addition of ammonia is sufficient.

Treated with the several solutions above described the product is a mass of clean fiber free from woody material or shive, and free from the resinous or gummy substances, which when dried is ready for the market without further treatment. The fibers are readily separated and in color are about the natural color of the flax straw.

If a lighter colored fiber is desired, the mass of fiber after it is subjected to the soap solution and washed is subjected for a short time to the action of a bleaching solution containing sulfuric acid, nitric acid and peroxid of hydrogen in the proportions of six tenths of an ounce of sulfuric acid to five gallons of water, one fourth of an ounce of nitric acid and one fourth of an ounce of peroxid solution.

The process has been above described with particular reference to the treatment of flax fiber but it is equally applicable with equally favorable results to jute, hemp, ramie, and pita as well as to other fiber bearing plants, the only variation of the process as above described necessary in the treatment of fiber bearing plants other than flax being a variation of the strength of the degumming solution and in the length of time required for the treatment. If the flax straw is to be treated without preliminary removal of the shive by mechanical means the degumming solution will need to be used about twice the strength of the solution above described, but for reasons above set forth it is preferable to get rid of so much of the shive as can be removed mechanically before subjecting the fiber to the degumming solution.

Having thus described my invention, what I claim as new and desire to secure by Letters Patent is:—

1. The herein described process of degumming the fibers of fiber bearing plants which comprises subjecting the fibers to a boiling solution containing caustic alkali, borate of soda and sal soda.

2. The herein described process of degumming the fibers of fiber bearing plants which comprises subjecting the fibers to a boiling solution containing caustic alkali, borate of soda and sal soda and also containing hydrocarbon oil.

3. The herein described process of degumming the fibers of fiber bearing plants which comprises subjecting the fibers to a boiling solution containing caustic alkali, borate of soda and sal soda and subsequently subjecting the treated fibers to an acid solution.

4. The herein described process of degumming the fibers of fiber bearing plants which comprises subjecting the fibers to a boiling solution containing caustic alkali, borate of soda and sal soda and subsequently subjecting the treated fibers successively to an acid solution and an alkaline solution.

5. The herein described process of degumming the fibers of fiber bearing plants which comprises subjecting the fibers to a boiling solution containing caustic alkali, borate of soda, and sal soda, and also containing hydrocarbon oil, and subsequently subjecting the treated fibers to an acid solution.

6. The herein described process of degumming the fibers of fiber bearing plants which comprises subjecting the fibers to a boiling solution containing caustic alkali, borate of soda, and sal soda, and also containing hydrocarbon oil, and subsequently subjecting the treated fibers successively to an acid solution and an alkaline solution.

7. The herein described process of treating fiber bearing plants which comprises first breaking up and removing the woody material or shive by mechanical means, and then boiling the fibers in a solution containing caustic alkali, borate of soda and sal soda.

8. The herein described process of treating fiber bearing plants which comprises first breaking up and removing the woody material or shive by mechanical means, and then boiling the fibers in a solution containing caustic alkali, borate of soda and sal soda, and also containing hydrocarbon oil.

9. The herein described process of treating fiber bearing plants which comprises first breaking up and removing the woody material or shive by mechanical means, boiling the fibers in a solution containing caustic alkali, borate of soda and sal soda and subsequently subjecting the material treated to an acid solution.

10. The herein described process of treating fiber bearing plants which comprises first breaking up and removing the woody material or shive by mechanical means, boiling the fibers in a solution containing caustic alkali, borate of soda and sal soda and subsequently subjecting the material treated successively to an acid solution and an alkaline solution.

11. The herein described degumming solution containing caustic alkali, borate of soda and sal soda.

12. The herein described degumming solution containing caustic alkali, borate of soda and sal soda and also containing hydrocarbon oil.

13. The herein described degumming solution containing caustic alkali, borate of soda, and sal soda in the proportions of 20 parts caustic alkali, 4 parts borate of soda and 6 parts sal soda.

14. The herein described degumming solution containing caustic alkali, borate of soda and sal soda in the proportions of 20 parts caustic alkali, 4 parts borate of soda and 6 parts sal soda and also containing hydrocarbon oil.

This specification signed and witnessed this 27th day of October A. D. 1909.

ROBERT R. ROBERTS.

In the presence of—
B. F. HAND,
WILLIAM J. ROBINSON.